United States Patent
Lim et al.

(10) Patent No.: US 12,259,021 B1
(45) Date of Patent: Mar. 25, 2025

(54) UNIVERSAL DRIVING DEVICE

(71) Applicants: HYUNDAI MOTOR COMPANY, Seoul (KR); KIA CORPORATION, Seoul (KR)

(72) Inventors: Woo Hyun Lim, Incheon (KR); Ki Seok Kim, Seongnam-si (KR); Kyoung Chul Min, Hwaseong-si (KR); Jong Sool Park, Hwaseong-si (KR); Dae In Lee, Anyang-si (KR); Yeo Hae Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/652,369

(22) Filed: May 1, 2024

(30) Foreign Application Priority Data

Dec. 14, 2023 (KR) .......................... 10-2023-0181910

(51) Int. Cl.
*F16H 1/36* (2006.01)
*F16H 1/28* (2006.01)
*F16H 1/46* (2006.01)
*F16H 1/00* (2006.01)
*F16H 57/02* (2012.01)

(52) U.S. Cl.
CPC .............. *F16H 1/2827* (2013.01); *F16H 1/46* (2013.01); *B60G 2204/4191* (2013.01); *F16H 1/006* (2013.01); *F16H 1/2836* (2013.01); *F16H 1/36* (2013.01); *F16H 2057/02043* (2013.01)

(58) Field of Classification Search
CPC . F16H 1/48; F16H 35/06; F16H 1/006; F16H 1/2827; F16H 1/2818; F16H 1/2845; F16H 1/2836; F16H 1/36; F16H 57/082; B60G 2204/4191
See application file for complete search history.

(56) References Cited

U.S. PATENT DOCUMENTS

| 2,893,268 | A * | 7/1959 | Liebel ................... F16H 1/2836 74/411 |
| 12,122,230 | B2 * | 10/2024 | Park ...................... F16H 1/2818 |
| 12,139,010 | B2 * | 11/2024 | Park ...................... F16H 57/082 |
| 2012/0015771 | A1 * | 1/2012 | Haeusler ............. B60K 17/046 475/183 |

FOREIGN PATENT DOCUMENTS

KR 20180064676 A * 6/2018

* cited by examiner

*Primary Examiner* — Sherry L Estremsky
(74) *Attorney, Agent, or Firm* — MCDONNELL BOEHNEN HULBERT & BERGHOFF LLP

(57) ABSTRACT

A universal driving device includes a ring gear, a sun gear having a variable inter-axis distance with respect to a rotation shaft of the ring gear, a gear train including a series of gears configured to connect the sun gear and the ring gear, link mechanisms configured to accommodate a change in an inter-axis distance between the sun gear and the ring gear and rotatably connected with respect to each other to continuously maintain a power transmission state between the sun gear and the ring gear, a carrier configured to support a rotation shaft of a final gear engaged with the ring gear, among the gears constituting the gear train, a sun gear bearing positioned between the rotation shaft of the sun gear and each of the link mechanisms, and a sleeve positioned between the sun gear bearing and each of the link mechanisms.

11 Claims, 14 Drawing Sheets

UNIVERSAL DRIVING DEVICE

CROSS REFERENCE TO RELATED APPLICATIONS

This application is based on and claims priority under 35 U.S.C. § 119 to Korean Patent Application No. 10-2023-0181910, filed on Dec. 14, 2023, in the Korean Intellectual Property Office, the disclosure of which is herein incorporated by reference in its entirety.

BACKGROUND

1. Field of the Disclosure

The present disclosure relates to a driving device that receives power from a rotational power source such as a motor and outputs a shifted rotational force.

2. Description of the Prior Art

A driving device of a vehicle transmits power from a rotational power source, such as an engine or motor, to wheels to drive the vehicle.

Recently, in-wheel motor driving devices in which a motor is directly installed on the driving wheel have been proposed. However, the in-wheel motor driving devices are not widely used due to problems with the durability of the motor and riding comfort due to increased unsprung mass.

The foregoing described as the background art is intended merely to aid in the understanding of the background of the present disclosure, and is not intended to mean that the present disclosure falls within the purview of the related art already known to those skilled in the art.

SUMMARY

One aspect of the present disclosure is to provide a universal driving device, which is a driving device that receives power from a rotational power source such as a motor and outputs a shifted rotational force, wherein when the universal driving device is applied to a vehicle, the input power can be appropriately decelerated to ensure excellent uphill driving and acceleration driving performance, power sources such as motors can be installed separately from wheels that are subject to severe shock and vibration, thereby improving the durability of the power source and ensuring excellent riding comfort due to the reduced unsprung mass of the vehicle, compared to in-wheel motor driving devices, and power can be continuously transmitted from the power source in response to the movement of the wheel without using constant velocity joints, etc., thereby reducing the space between the power source and the wheel, ultimately ensuring excellent utilization of space between the left and right wheels.

Particularly, another aspect of the present disclosure is to maintain smooth operation of the universal driving device so as to improve the durability.

A universal driving device in accordance with an aspect of the present disclosure includes: a ring gear; a sun gear in which a sun gear axis is moveable relative to a ring gear axis of the ring gear; a gear train including a series of gears configured to connect the sun gear and the ring gear; link mechanisms configured to accommodate the change in an inter-axis distance between the sun gear and the ring gear and connected to be relatively rotatable with respect to each other to continuously maintain a power transmission state between the sun gear and the ring gear, thereby supporting the rotation shafts of gears constituting the gear train; a carrier installed to support a rotation shaft of a final gear engaged with the ring gear, among the gears constituting the gear train; a sun gear bearing installed between the rotation shaft of the sun gear and the link mechanism; and a sleeve installed between the sun gear bearing and the link mechanism.

The link mechanism include a first link and a second link connected to be relatively rotatable with respect to each other, a gear having a rotation shaft configured to support the first link and the second link such that the first link and the second link are relatively rotatable with respect to each other is a joint gear, and the gear train includes: a first intermediate gear configured to connect the sun gear and the joint gear; a second intermediate gear configured to connect the joint gear and a final gear; the joint gear; and the final gear.

The first link is coupled to the rotation shaft of the sun gear through the sleeve and the sun gear bearing.

The plurality of gear trains and the plurality of link mechanisms are provided, and each of the first links constituting the plurality of link mechanisms is coupled to the rotation shaft of the sun gear through the sleeve and the sun gear bearing while being axially overlapped with the rotation shaft of the sun gear.

The link mechanisms configured to support one gear train are symmetrically provided on the opposite sides of the gear train; and the first links of the link mechanisms are provided on the opposite axial sides of the sun gear, respectively, each first link being coupled to the rotation shaft of the sun gear through the sleeve and the sun gear bearing.

The carrier is provided with a contact avoidance part to avoid contact between the sun gear and the carrier when an inter-axis distance of the sun gear with respect to the ring gear changes.

The carrier includes an outer carrier and an inner carrier combined with each other and configured to support, on the opposite sides thereof, the rotation shaft of the final gear; a contact avoidance groove constituting a contact avoidance part is formed through the surface of the outer carrier facing the gear train; and a contact avoidance hole through which the rotation shaft of the sun gear passes is formed through the inner carrier, the contact avoidance hole constituting the contact avoidance part.

A wheel hub is connected to the ring gear.

The wheel hub and the ring gear are concentrically coupled to each other by a spline.

A carrier boss inserted into the inside of the wheel hub is formed integrally with the outer carrier; and a hub bearing is provided between the carrier boss and the wheel hub.

The sun gear, the joint gear, and the final gear all have the same number of teeth.

The present disclosure provides a universal driving device, which is a driving device that receives power from a rotational power source such as a motor and outputs a shifted rotational force, wherein when the universal driving device is applied to a vehicle, the input power can be appropriately decelerated to ensure excellent uphill and acceleration driving performance, power sources such as motors can be installed separately from wheels that are subject to severe shock and vibration, thereby improving the durability of the power source and ensuring excellent riding comfort due to the reduced unsprung mass of the vehicle, compared to in-wheel motor driving devices, and power can be continuously transmitted from the power source in response to the movement of the wheel without using constant velocity joints, etc., thereby reducing the space between the power source and the wheel, ultimately ensuring excellent utilization of space between the left and right wheels.

Particularly, the present disclosure enables the universal driving device to maintain smooth operation so as to improve the durability.

BRIEF DESCRIPTION OF THE FIGURES

The above and other aspects, features, and advantages of the present disclosure will be more apparent from the following detailed description taken in conjunction with the accompanying drawings, in which.

DETAILED DESCRIPTION

Figure 1:
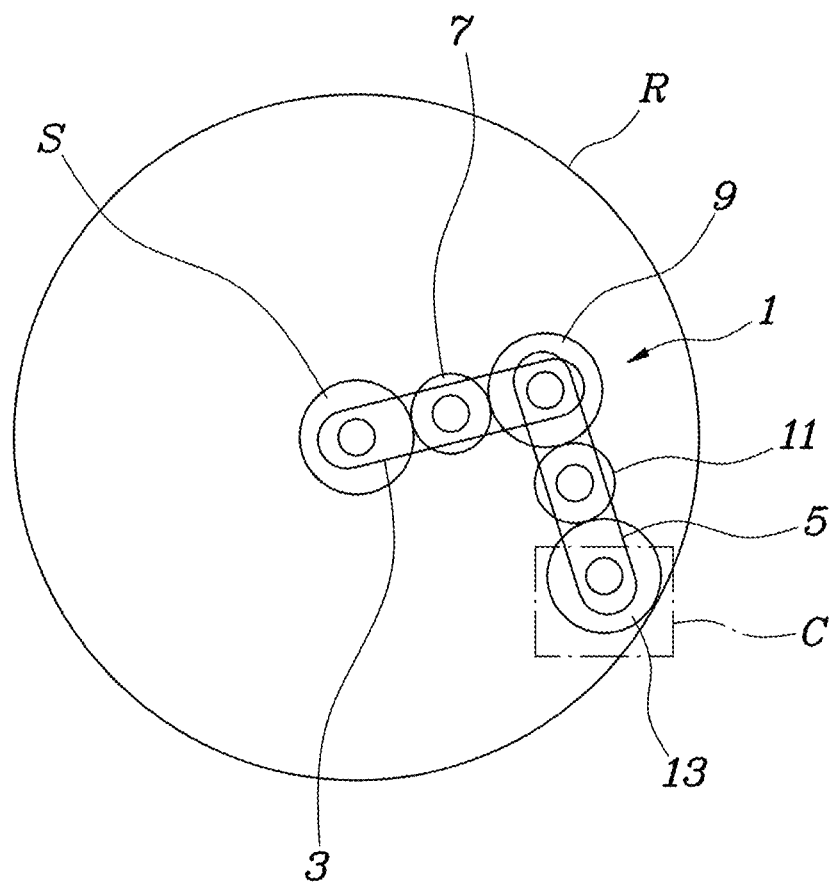
FIG. 1 illustrates a basic configuration of a universal driving device according to the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the case of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 2:
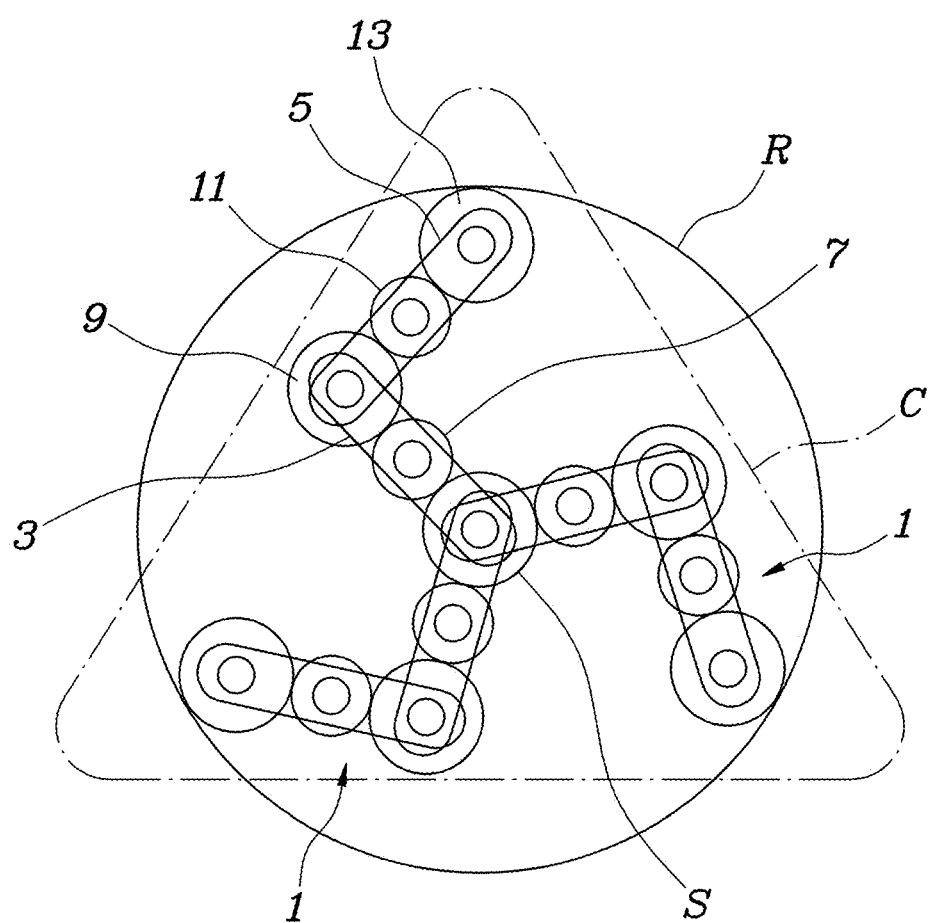
FIG. 2 illustrates an embodiment of a universal driving device according to the present disclosure.

For reference, FIG. 1 illustrates a basic configuration of the universal driving device according to the present disclosure, and for explanation of the principle, is an example of the universal driving device including one gear train 1, and FIG. 2 is an example of the universal driving device including three gear trains 1.

Referring to FIGS. 1 to 10, the universal driving device (U) according to the present disclosure includes: a ring gear (R), a sun gear (S) in which a sun gear axis is moveable relative to a ring gear axis of the ring gear (R), a gear train 1 configured to connect the sun gear (S) and the ring gear (R), and link mechanisms configured to accommodate the change in an inter-axis distance between the sun gear (S) and the ring gear (R) and connected to be relatively rotatable with respect to each other to continuously maintain the power transmission state between the sun gear and the ring gear, thereby supporting the rotation shafts of gears constituting the gear train 1.

In the present embodiment, the link structure includes: a first link 3, one end of which supports the rotation shaft (S_SH) of the sun gear (S); and a second link 5 rotatably connected to the first link 3.

That is, one gear train 1 includes a series of gears arranged such that rotation shafts are supported by the first link 3 and the second link 5, respectively, to transmit rotational force between the sun gear (S) and the ring gear (R).

In the present embodiment, the gear train 1 includes a first intermediate gear 7 engaged with the sun gear (S), a joint gear 9 engaged with the first intermediate gear 7, the rotation shaft of the joint gear serving as a rotation shaft between the first link 3 and the second link 5, a second intermediate gear 11 engaged with the joint gear 9, and a final gear 13 engaged with the second intermediate gear 11 and engaged with the ring gear (R).

The rotation shaft of the first intermediate gear 7 and the rotation shaft of the joint gear 9 are fixed to the first link 3; the rotation shaft of the joint gear 9, the rotation shaft of the second intermediate gear 11, and the rotation shaft of the final gear 13 are fixed to the second link 5; and the rotation shaft of the final gear 13 is supported by the ring gear (R) and a carrier (C) configured such that a relative motion of the carrier is restricted.

The number of teeth of each of the sun gear (S) and the joint gear 9 is formed to be the same as the number of teeth of the final gear 13.

That is, the sun gear (S), the joint gear 9, and the final gear 13 all have the same number of teeth.

As described above, when the sun gear (S), the joint gear 9, and the final gear 13 have the same number of teeth, the relative phase of the sun gear (S) and ring gear (R) remains constant with respect to the relative motion of the rotation shafts of the sun gear (S) and the ring gear (R) in the up, down, left, and right directions.

Figure 3:
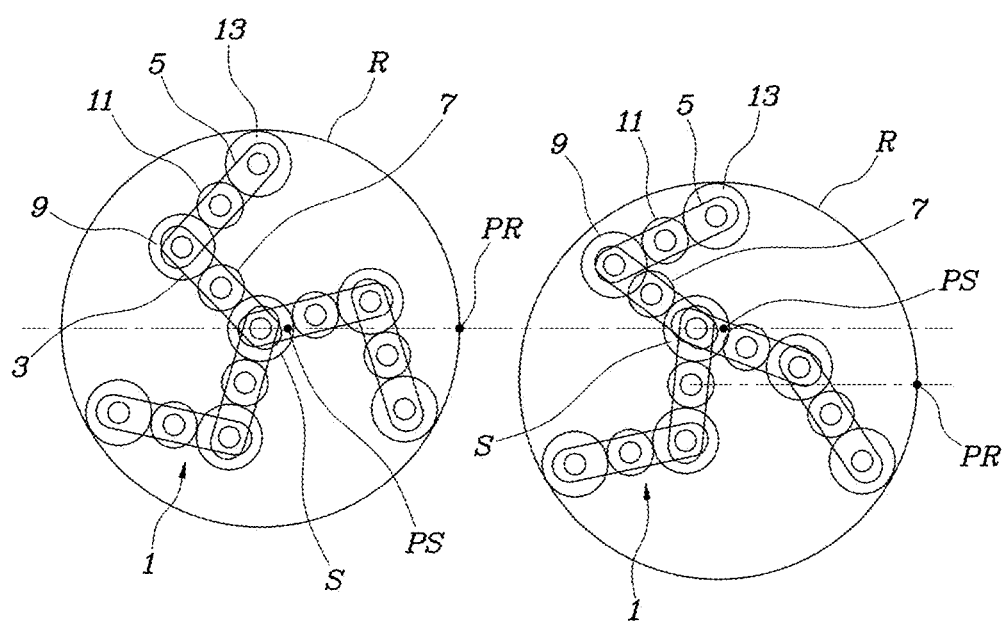
FIG. 3 illustrates a state in which a ring gear is relatively lowered, compared to the state of FIG. 2.
Figure 4:
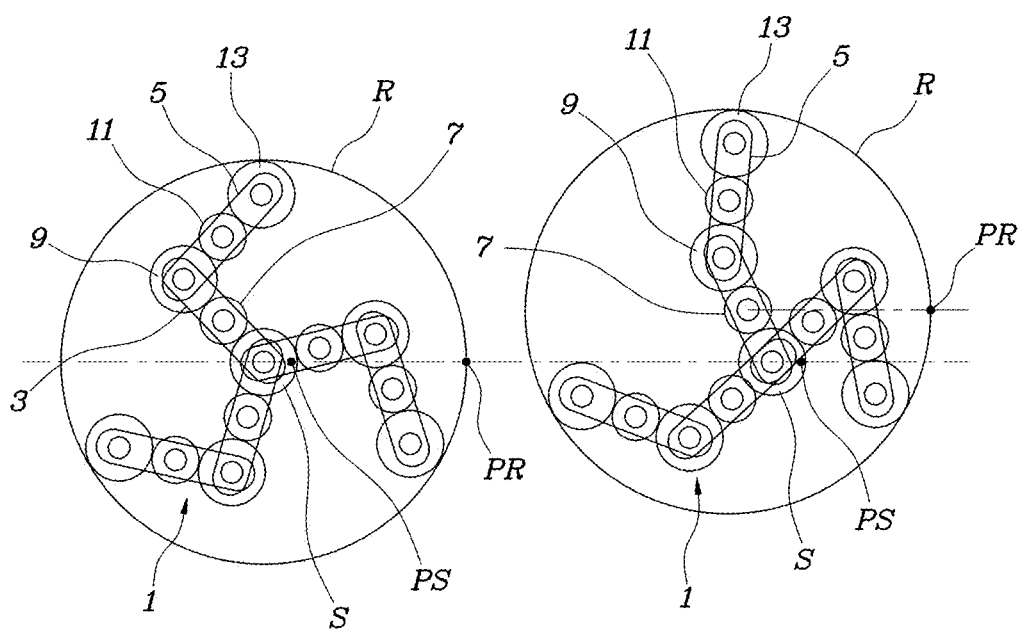
FIG. 4 illustrates a state in which the ring gear is relatively raised, compared to the state in FIG. 2.
Figure 5:
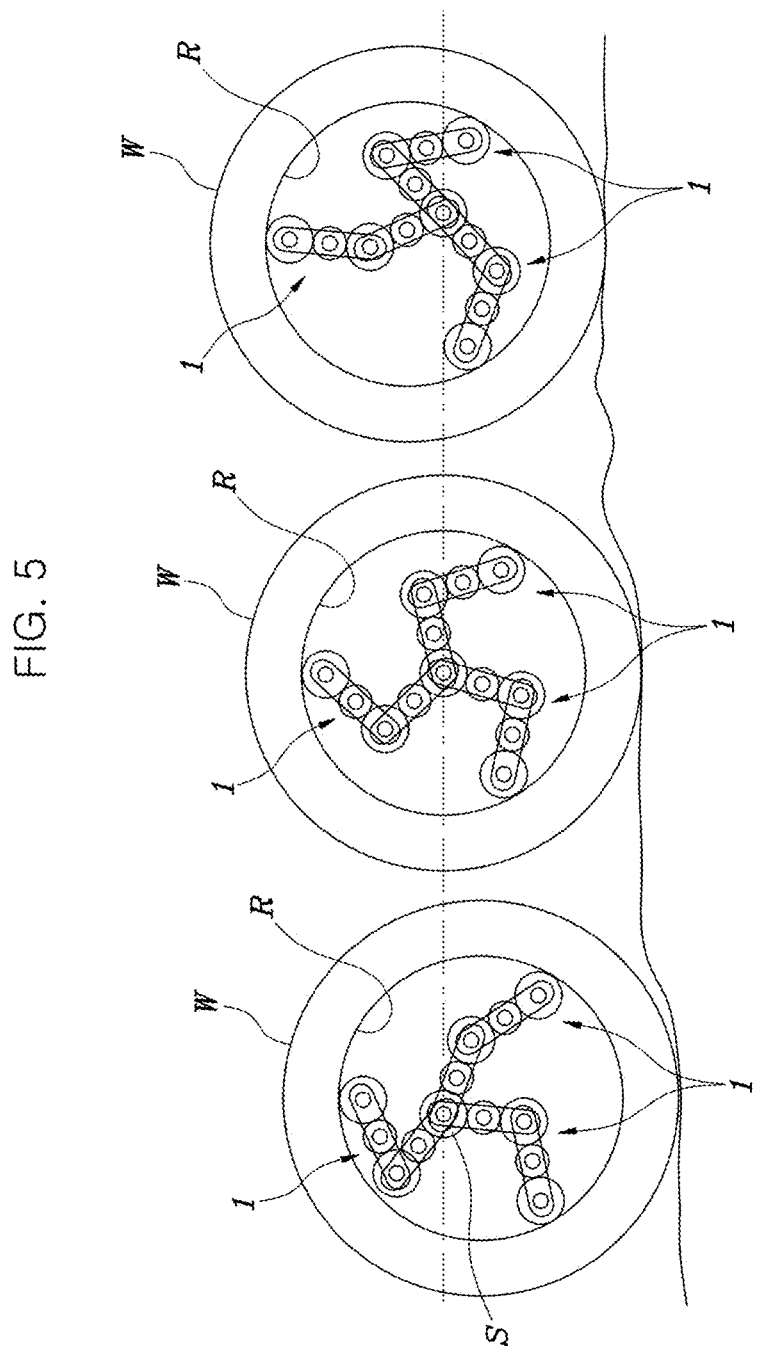
FIG. 5 illustrates an example of applying the embodiment of FIG. 2 to a vehicle, and compares the raising and lowering of ring gears and wheels with respect to sun gears depending on changes in a road surface.

The relative phase of the sun gear (S) and the ring gear (R), which remains constant with respect to the relative motion thereof, can be expressed as the rotational phase of the points (PS, PR) respectively marked on the sun gear (S) and ring gear (R), as shown in FIGS. 3 and 4, which remains constant even when the ring gear (R) moves up and down or moves left and right with respect to the sun gear (S).

That is, when the sun gear (S), the joint gear 9, and the final gear 13 have the same number of teeth, relative rotation between the sun gear (S) and ring gear (R) occurring due to a change in an inter-axis distance between the sun gear (S) and ring gear (R) is prevented.

Therefore, the power transmitted from the sun gear (S) is transmitted to the ring gear (R) at a constant speed, regardless of the change in an inter-axis distance between the sun gear (S) and the ring gear (R). Accordingly, when the power generated by a motor (M) is transmitted from the sun gear (S) to the wheel (W) via the ring gear (R) in a vehicle to which the universal driving device (U) of the present disclosure is applied, stable control of output torque through the motor (M) is achieved since the phase of the motor (M) connected to the sun gear (S) and the phase of the wheel (W) connected to the ring gear (R) remain unchanged even if the ring gear (R) and the wheel (W) move up and down or move left and right with respect to the rotation shaft (S-SH) of the motor (M) or sun gear (S), thereby ensuring stable driving of the vehicle.

If any one of the sun gear (S), the joint gear 9, and the final gear 13 has a different number of teeth, failing to satisfy the condition described above, the ring gear (R) and wheel (W) may move up, down, left and right with respect to the sun gear (S) and motor (M) even if the motor (M) rotates at a constant speed as described above. Accordingly, relative rotation between the sun gear (S) and ring gear (R) may occur and, as a result, the vehicle may experience vibration, that is, surging, depending on the vehicle's driving direction.

Figure 6:
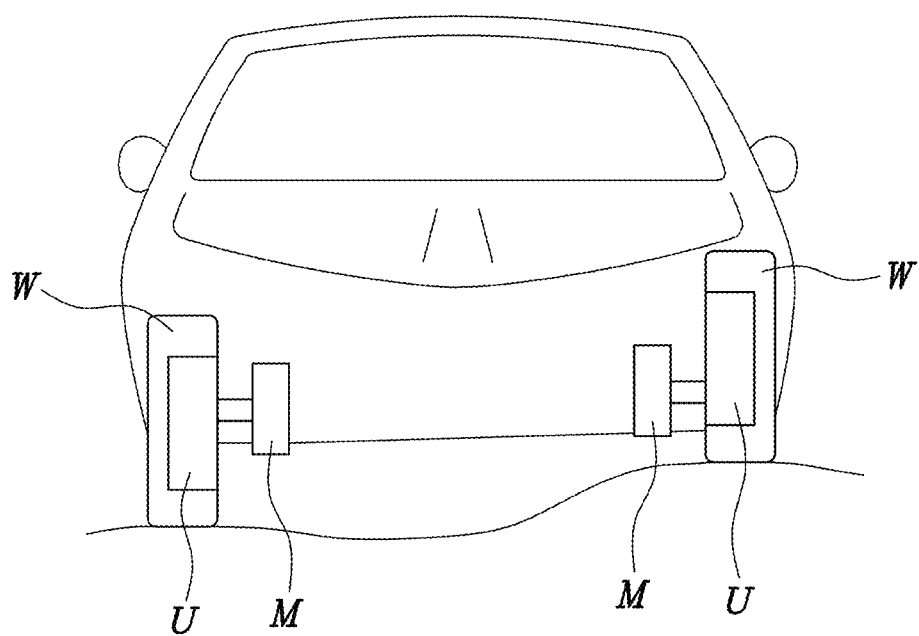
FIG. 6 illustrates an example of applying a universal driving device according to the present disclosure to a vehicle.
Figure 7:
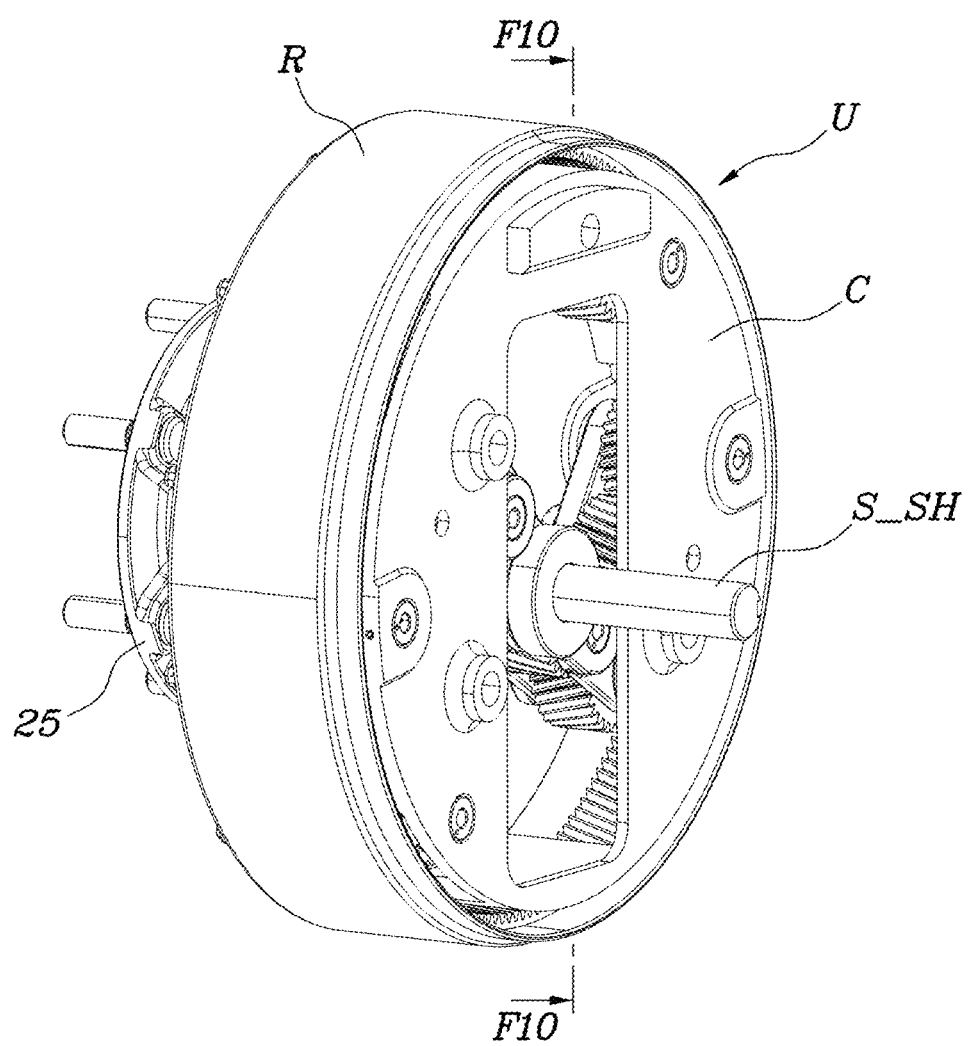
FIG. 7 illustrates another embodiment of a universal driving device according to the present disclosure.
Figure 8:
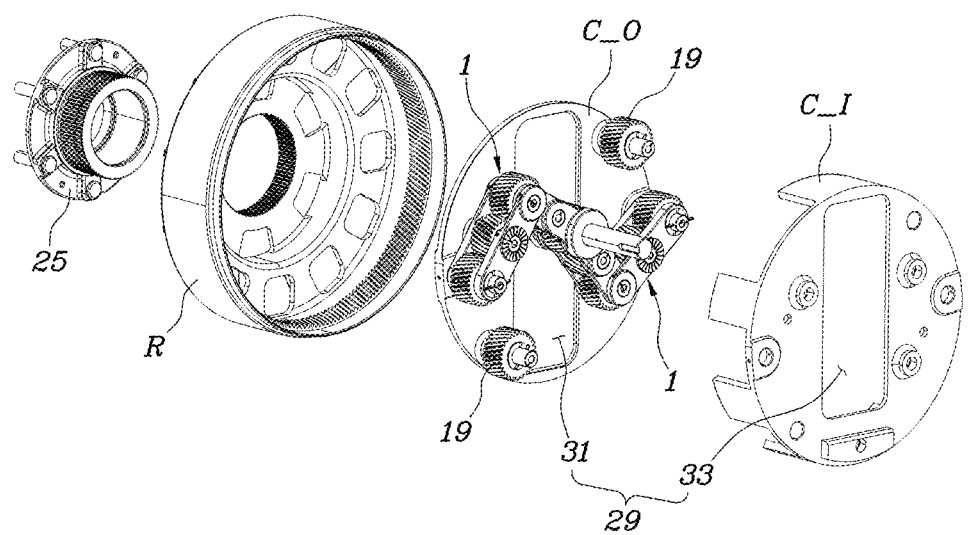
FIG. 8 is an exploded perspective view of the universal driving device of FIG. 7.
Figure 9:
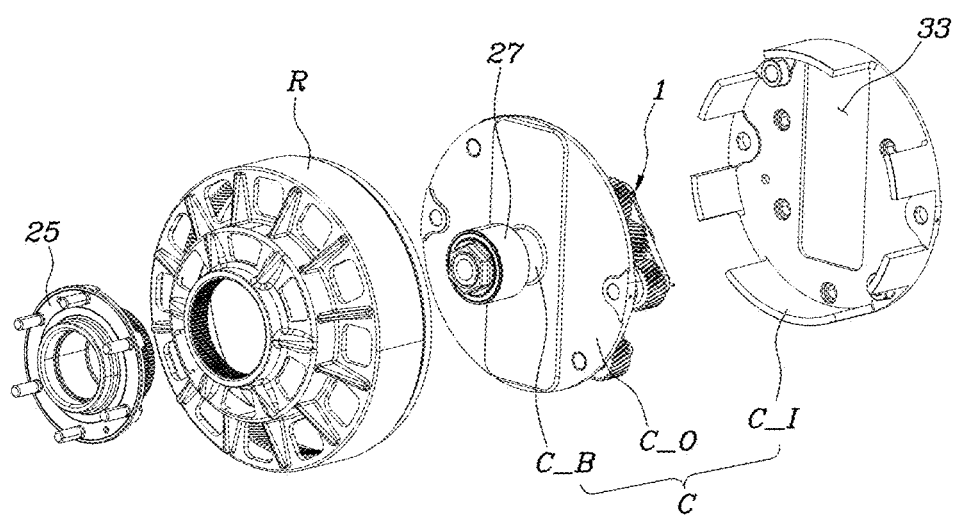
FIG. 9 is an observation view in the opposite direction with respect to FIG. 8.
Figure 10:
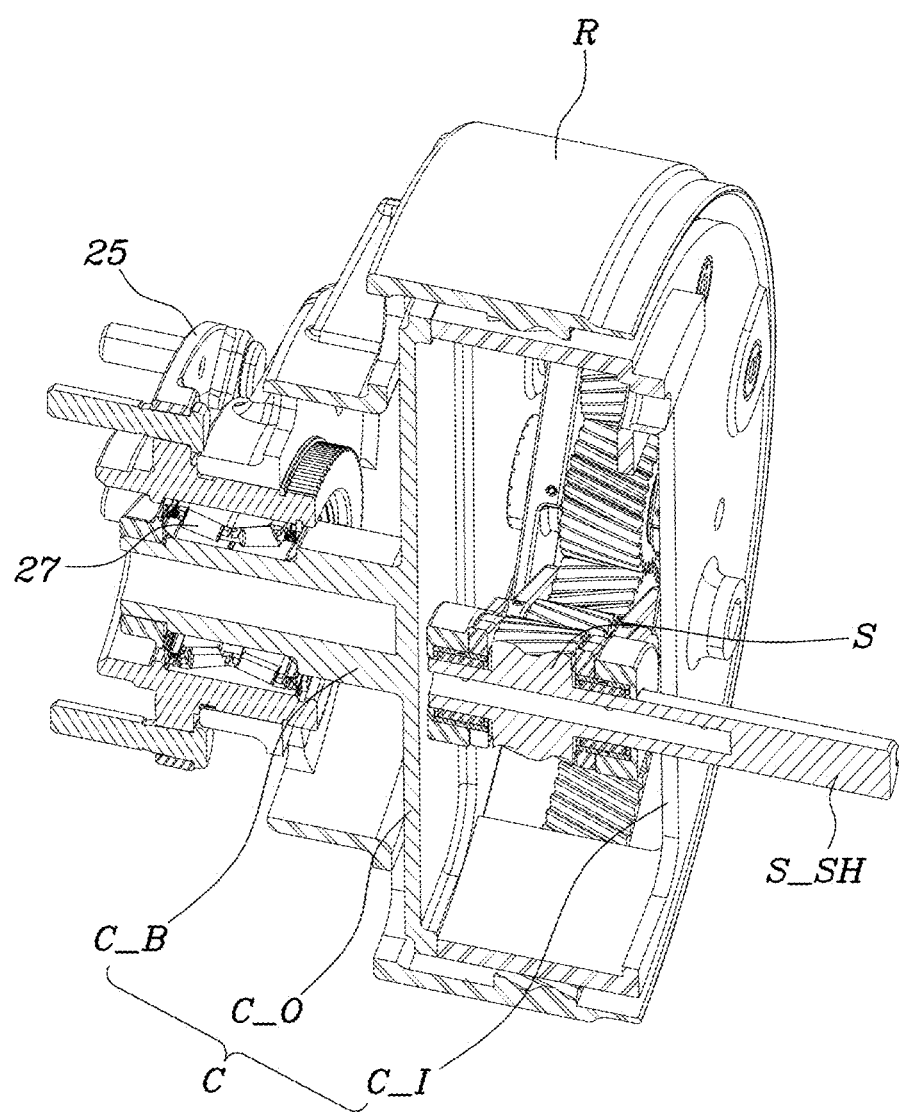
FIG. 10 is a cross-sectional view, taken along line F10-F10 of FIG. 7.
Figure 11:
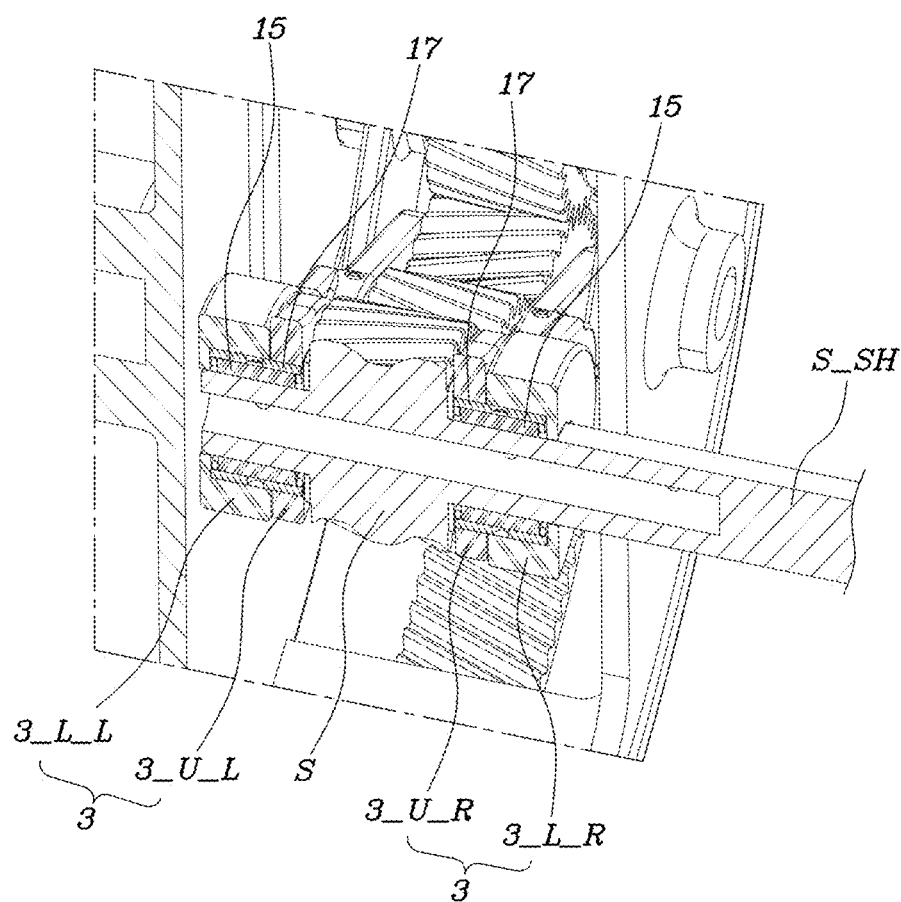
FIG. 11 is a detailed view of main parts in FIG. 10.

FIG. 6 illustrates that the universal driving device (U) of the present disclosure can be used as a driving device for a vehicle by connecting the rotation shaft of the motor (M) to the sun gear (S) and connecting the wheel (W) to the ring gear (R).

In this case, the power input to the sun gear (S) is decelerated and output to the ring gear (R), thereby ensuring excellent uphill driving and acceleration driving performance of the vehicle.

In addition, the motor (M) may be installed separately outside the wheel (W), which is subject to severe shock and vibration, rather than being installed inside the wheel (W), thereby improving the durability of the motor (M) and securing excellent riding comfort due to the reduced unsprung mass of the vehicle, compared to the in-wheel motor driving device.

In addition, as described above, constant power can be transmitted while allowing the ring gear (R) connected to the wheel (W) to be raised and lowered with respect to the sun gear (S) connected to the power source, so that power can be continuously transmitted from the power source in response to the up-down and left-right movements of the wheel (W) without using conventional constant velocity joints, etc.

Accordingly, a vehicle with excellent utilization of the space between the left wheel (W) and the right wheel (W) can be ultimately manufactured by reducing the space between the power source and the wheels (W).

Referring to FIGS. 7 to 14, the universal driving device according to the present disclosure includes: a ring gear (R); a sun gear (S) installed to have a variable inter-axis distance with respect to the rotation shaft of the ring gear (R); a gear train 1 including a series of gears configured to connect the sun gear (S) and the ring gear (R); link mechanisms configured to accommodate the change in an inter-axis distance between the sun gear (S) and the ring gear (R) and connected to be relatively rotatable with respect to each other to continuously maintain the power transmission state between the sun gear and the ring gear, thereby supporting the rotation shafts of gears constituting the gear train 1; a carrier (C) installed to support the rotation shaft of a final gear engaged with the ring gear (R), among the gears constituting the gear train 1; a sun gear bearing 15 installed between the rotation shaft (S_SH) of the sun gear (S) and the link mechanism; and a sleeve 17 installed between the sun gear bearing 15 and the link mechanism.

That is, in the present disclosure as described above, the durability and smooth operation between the rotation shaft (S_SH) of the sun gear (S) and the link mechanism can be ensured by interposing the sun gear bearing 15 and the sleeve 17 between the rotation shaft (S_SH) of the sun gear (S) and the link mechanism.

The rotation shaft (S_SH) of the sun gear (S) moves so that an inter-axis distance with respect to the rotation shaft of the ring gear (R) changes. At this time, the smooth rotation between the link mechanism and the rotation shaft (S_SH) of the sun gear (S) is ensured by the sun gear bearing 15, and the force applied by the link mechanism to the rotation shaft (S_SH) of the sun gear (S) in a direction perpendicular to the rotation shaft (S_SH) of the sun gear (S) is supported by the sleeve 17 so as to ensure the durability of the sun gear bearing 15.

For reference, unlike the embodiments of FIGS. 1 and 2, the embodiments of FIGS. 7 to 14 are embodiments of a universal driving device having the link mechanisms and two gear trains 1.

In addition, a support gear 19 is installed on the carrier (C) to further support the ring gear (R).

As described above, the link mechanism includes the first link 3 and the second link 5 connected to be relatively rotatable with respect to each other, a gear having a rotation shaft configured to support the first link 3 and the second link 5 such that the first link 3 and the second link 5 are relatively rotatable is a joint gear 9, and the gear train 1 includes: the first intermediate gear 7 configured to connect the sun gear (S) and the joint gear 9; the second intermediate gear 11 configured to connect the joint gear 9 and the final gear 13; the joint gear 9; and the final gear 13.

Particularly, among the first link 3 and the second link 5 constituting the link mechanism, the first link 3 is coupled to the rotation shaft (S_SH) of the sun gear (S) through the sleeve 17 and the sun gear bearing 15.

Like the universal driving device of the present embodiment, the plurality of gear trains 1 and the plurality of link mechanisms may be provided, and each of the first links 3 constituting the plurality of link mechanisms is coupled to the rotation shaft (S_SH) of the sun gear (S) through the sleeve 17 and the sun gear bearing 15 while being axially overlapped with the rotation shaft (S_SH) of the sun gear (S).

Figure 12:
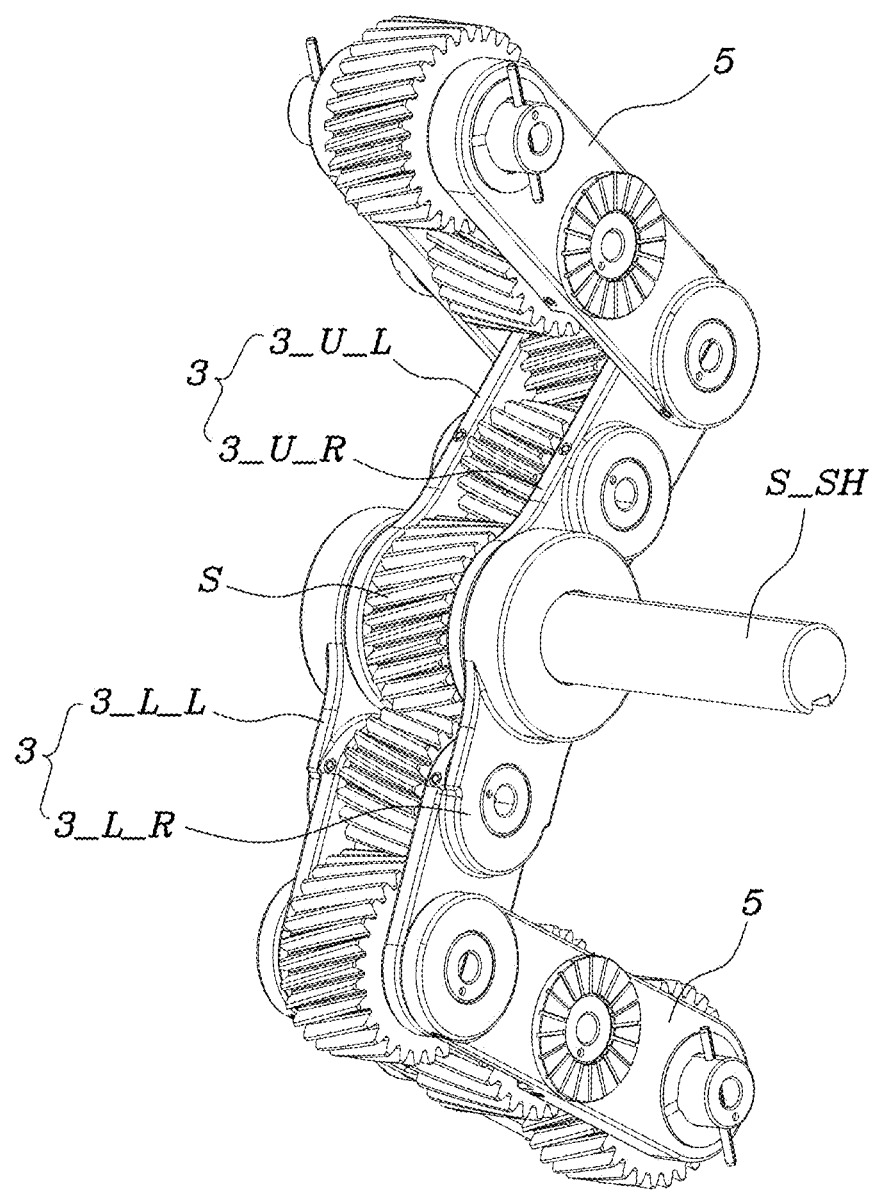
FIG. 12 is a detailed view of gear trains and link mechanisms of FIG. 8.
Figure 13:
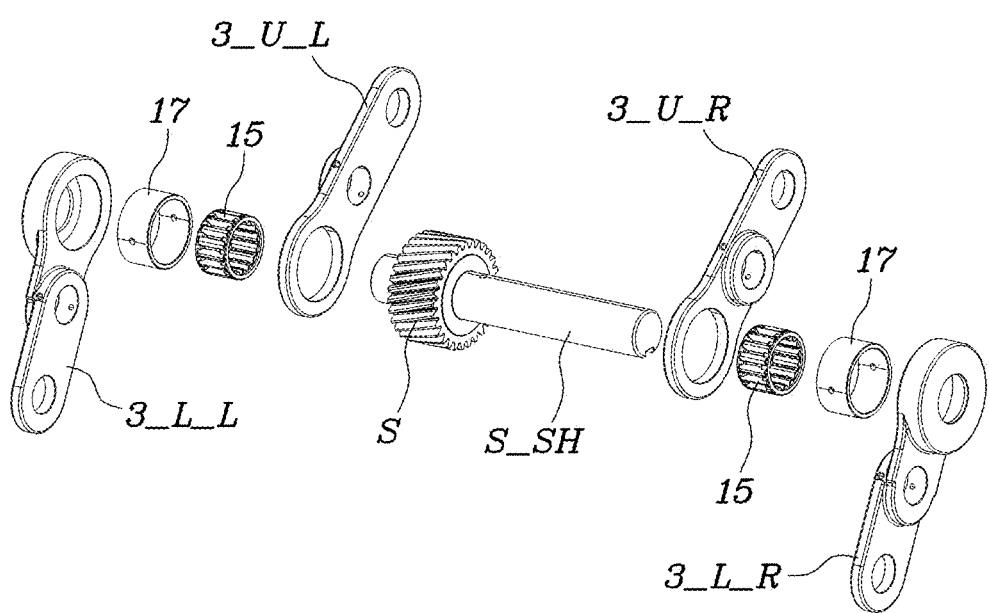
FIG. 13 is an exploded view showing a sun gear and a first link of FIG. 8.
Figure 14:
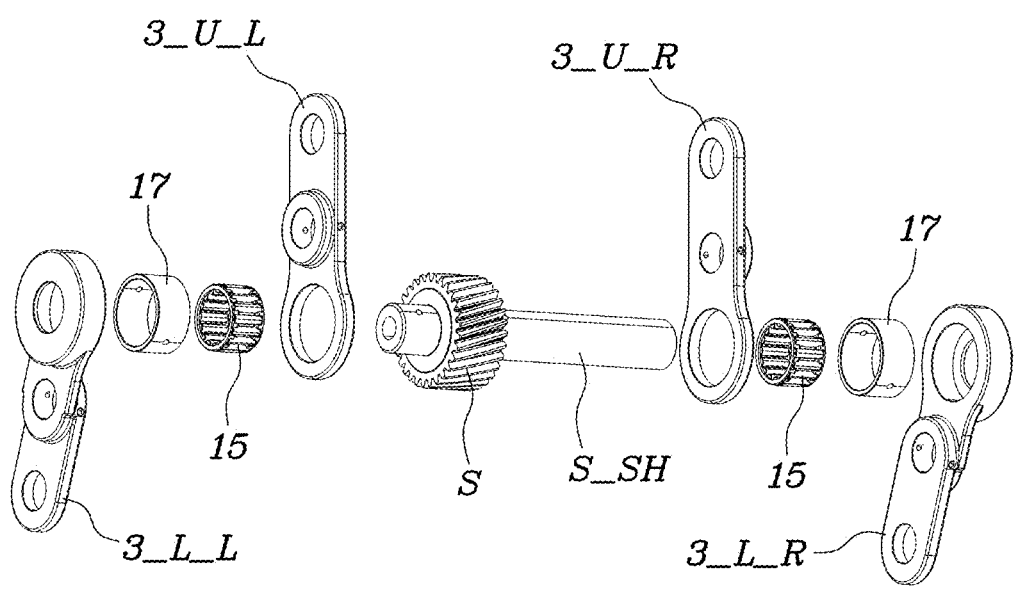
FIG. 14 is an observation view in the opposite direction with respect to FIG. 13.

That is, as noted from FIGS. 12 to 14, the plurality of gear trains 1 and link mechanisms include an upper gear train (1_U) and an upper link mechanism, which are provided on the upper side of the sun gear (S), and a lower gear train (1_L) and a lower link mechanism, which are provided on the lower side of the sun gear (S).

In addition, the link mechanisms configured to support one gear train 1 are symmetrically provided on the opposite sides of the gear train 1; and the first links 3 of the link mechanisms are provided on the opposite axial sides of the sun gear (S), respectively, each first link 3 being coupled to the rotation shaft (S_SH) of the sun gear (S) through the sleeve 17 and the sun gear bearing 15.

Therefore, in FIGS. 12 to 14, the upper link mechanisms supporting the rotation shafts of the upper gear train (1_U) are symmetrically provided on the opposite sides of the upper gear train (1_U), and the lower link mechanisms supporting the rotation shafts of the lower gear train (1_L) are symmetrically provided on the opposite sides of the lower gear train (1_L).

In addition, the upper link mechanisms provided symmetrically on the opposite sides of the upper gear train (1_U) respectively include the first links 3, and are indicated as (3_U_L) and (3_U_R) so as to be easily and clearly distinguished from each other, and the lower link mechanisms provided symmetrically on the opposite sides of the lower gear train (1_L) also respectively include the first links 3, and are indicated as (3_L_L) and (3-L_R) so as to be easily and clearly distinguished from each other.

The carrier (C) is provided with a contact avoidance part 29 to avoid contact between the sun gear (S) and the carrier (C) when the inter-axis distance of the sun gear (S) with respect to the ring gear (R) changes.

That is, the carrier (C) includes an outer carrier (C_O) and an inner carrier (C_I) combined with each other and supporting, on the opposite sides thereof, the rotation shaft of the final gear 13, a contact avoidance groove 31 constituting a contact avoidance part 29 is formed through the surface of the outer carrier (C_O) facing the gear train 1, and a contact avoidance hole 33 through which the rotation shaft (S_SH) of the sun gear (S) passes is formed through the inner carrier (C_I), the contact avoidance hole 33 constituting the contact avoidance part 29.

Therefore, when an inter-axis distance between the axes of the sun gear (S) and the ring gear (R) changes, the sun gear (S) can relatively moves with respect to the ring gear (R) without interference with the carrier (C) while continuously and smoothly transmitting power to the ring gear (R).

For reference, as described in the present embodiment, the rotation shaft (S_SH) of the sun gear (S) may be formed integrally with the sun gear (S) and may include a separate shaft inserted through the sun gear (S). In addition, the rotation shaft (S_SH) of the sun gear (S) may be used as an input shaft that inputs power to the universal driving device of the present disclosure, so as to be connected to the motor (M) of the vehicle as described above.

In the embodiment, a wheel hub 25 is concentrically coupled to the ring gear (R) by using a spline.

Therefore, when a wheel is mounted on the wheel hub 25, the universal driving device (U) of the present disclosure may be used as a driving wheel of the vehicle.

Here, a carrier boss (C_B) inserted into the inside of the wheel hub 25 is formed integrally with the outer carrier (C_O); and a hub bearing 27 is provided between the carrier boss (C_B) and the wheel hub 25.

Accordingly, the concentric arrangement between the carrier (C) and the wheel hub 25 and the ring gear (R) is stably maintained, thereby ensuring the smooth operation and the durability.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A universal driving device comprising:
a ring gear;
a sun gear having a sun gear axis is moveable relative to a ring gear axis of the ring gear;
a gear train comprising a series of gears configured to connect the sun gear and the ring gear;
a plurality of link mechanisms configured to accommodate a change in an inter-axis distance between the sun gear and the ring gear, and rotatably connected with respect to each other to continuously maintain a power transmission state between the sun gear and the ring gear, thereby supporting rotation shafts of gears constituting the gear train;
a carrier configured to support a rotation shaft of a final gear engaged with the ring gear, among the gears constituting the gear train;
a sun gear bearing positioned between the rotation shaft of the sun gear and each of the plurality of link mechanisms; and
a sleeve positioned between the sun gear bearing and each of the plurality of link mechanisms.

2. The universal driving device of claim 1, wherein each of the plurality of link mechanisms comprises a first link and a second link connected relatively rotatable with respect to each other;
wherein a joint gear has a rotation shaft configured to support the first link and the second link such that the first link and the second link are relatively rotatable with respect to each other; and
wherein the gear train comprises a first intermediate gear configured to connect the sun gear and the joint gear, a second intermediate gear configured to connect the joint gear and a final gear, the joint gear, and the final gear.

3. The universal driving device of claim 2, wherein the first link is coupled to the rotation shaft of the sun gear through the sleeve and the sun gear bearing.

4. The universal driving device of claim 3, wherein the gear train comprised a plurality of gear trains, and
wherein each of the first links constituting the plurality of link mechanisms is coupled to the rotation shaft of the sun gear through the sleeve and the sun gear bearing while being axially overlapped with the rotation shaft of the sun gear.

5. The universal driving device of claim 4, wherein the plurality of link mechanisms configured to support one gear train are symmetrically positioned on opposite sides of the gear train, and
wherein the first links of the plurality of link mechanisms are positioned on opposite axial sides of the sun gear, each first link being coupled to the rotation shaft of the sun gear through the sleeve and the sun gear bearing.

6. The universal driving device of claim 5, wherein the carrier is provided with a contact avoidance part configured to avoid contact between the sun gear and the carrier when an inter-axis distance of the sun gear with respect to the ring gear changes.

7. The universal driving device of claim 6, wherein the carrier comprises an outer carrier and an inner carrier combined with each other and configured to support, on opposite sides, the rotation shaft of the final gear;
- wherein the contact avoidance part includes a contact avoidance groove formed through a surface of the outer carrier facing the gear train; and
- wherein the contact avoidance part further includes a contact avoidance hole through which the rotation shaft of the sun gear passes formed through the inner carrier.

8. The universal driving device of claim 7, wherein a wheel hub is connected to the ring gear.

9. The universal driving device of claim 8, wherein the wheel hub and the ring gear are concentrically coupled to each other by a spline.

10. The universal driving device of claim 9, wherein a carrier boss inserted into an inside of the wheel hub is formed integrally with the outer carrier, and wherein a hub bearing is positioned between the carrier boss and the wheel hub.

11. The universal driving device of claim 1, wherein the sun gear, the joint gear, and the final gear all have an identical number of teeth.

\* \* \* \* \*